3,512,978
DIAZOSULFONATE COMPOSITION, COPYING MATERIAL, AND METHOD OF USE
Michael J. Lubar, Parsippany, N.J., assignor to Keuffel & Esser Company, a corporation of New Jersey
No Drawing. Filed Mar. 21, 1966, Ser. No. 535,681
Int. Cl. G03c 1/56, 5/34
U.S. Cl. 96—49                   3 Claims

ABSTRACT OF THE DISCLOSURE

Diazotype material is provided which comprises a diazo sulfonate compound and an azo dye coupler intimately combined in a composition which is stabilized in an alkaline medium. Imagewise exposure of such diazotype material to actinic radiation immediately produces a corresponding dye image without further processing. The application of a reducing agent to unexposed areas of the composition precludes further dye formation, thereby fixing the print-out image.

---

The present invention relates to direct print-out photographic material, and more particularly to compositions useful for the preparation of diazotype materials capable of producing visible, permanent images directly upon exposure to light, and to a method of using the same.

The invention makes use of a composition comprising a diazo sulfonate capable of decomposing under the influence of actinic radiation to produce a diazonium compound which will form a permanent azo dye with an appropriate azo coupling compound. The composition further comprises an azo coupling compound and sufficient pH adjusting materials to provide a medium conducive to the formation of an azo dye. The formation of diazonium compound upon the incidence of actinic radiation is accompanied by immediate azo dye formation and results in a direct print-out of image exposures.

According to the present invention, diazotype material is provided which comprises a diazo sulfonate compound and an azo dye coupler intimately combined in a composition which is stabilized in a highly alkaline medium. The diazo sulfonate compound is readily decomposed by actinic radiation to yield a diazonium compound capable of combining with the azo coupler to form an azo dye in the alkaline medium. Imagewise exposure of such sheet material to actinic radiation immediately produces a corresponding dye image without further processing. Subsequent to exposure and image formation, the application of a reducing agent to the remaining unexposed diazo sulfonate composition completely decomposes the composition and renders it incapable of dye formation. The dye image is thereby permanently fixed.

Diazo sulfonates have previously been suggested for use in various image making processes. Such processes include positive-and negative-working photosensitive systems, and systems based upon a thermosensitive reactivity of certain diazo sulfonate compositions. Regardless of the type of process in which the diazo sulfonates were used, the inherent instability of these materials rendered such processes impractical.

The instability of the diazo sulfonates was manifest, particularly in two-component diazotype compositions, i.e. those including both a diazo compound and an azo dye coupler compound, by an excessive tendency to form the dye in storage. This pre-coupling rendered previous diazo sulfonate compositions worthless after very short storage periods.

In the manner of diazotype processes comprising diazonium compounds, vis-a-vis diazo sulfonates, previous methods of stabilizing diazo sulfonate compositions relied entirely upon the acidification of the composition. Although some acid materials were particularly developed for the purpose of stabilizing these compositions, few, if any, provided a practical product. The pre-coupling tendency of the diazo sulfonates or the diazonium compounds produced by the ready decomposition of the sulfonates was apparently uncontrollable and very few useful diazotype materials were prepared.

Further attempts to render diazo sulfonate compositions more stable to ordinary storage were made and some specific diazo sulfonate compounds were prepared and suggested as being of satisfactory stability for use in two-component diazotype systems. While particular improvement in storage stability was achieved, the photosensitivity of the sulfonate compositions was reduced to such an extent that entirely impractical exposure times were required to produce even marginally acceptable images.

The usefulness of these previously suggested materials was further hindered by the lack of photosensitivity of some negative-working diazo sulfonate compositions in that the normal procedure of fixing a diazotype image was ineffectual. Whereas exposure of undesired areas of a diazotype sheet to actinic radiation usually renders such areas incapable of future dye formation, the low degree of photosensitivity in the diazonium compound yielded by decomposition of the diazo sulfonate for the most part eliminated this method as a fixing means. Involved washing to remove the potentially reactive diazonium compound from the base sheet was found to be required as a means of minimizing the post-coupling tendencies of background areas.

Diazotype materials comprising diazo sulfonates previously suggested for photoreproduction processes have required subsequent development steps, either by application of an alkalizer, such as ammonia gas, or an alkaline developing solution containing an azo dye coupler compound. These diazotype materials have therefore provided no capability of direct photo-initiated print-out.

The noted attempts to meet the requirements of stability through the preparation of specific diazo sulfonate compounds have resulted in not only the low rates of photo-sensitivity, but also in a very limited range of useful sulfonates. Few of the sulfonate compounds exhibiting other properties of borderline acceptability had the capability of forming dyes of good density and color. Apparently, the low coupling energies associated with these diazo materials resulted from the attempts to tailor storage stability for the diazo sulfonate compositions.

The diazo sulfonate materials and the method of using the same associated with the present invention eliminate these various undesirable characteristics of a diazotype sheet and further add the capability of a direct print-out sheet operable at relatively fast speeds. Furthermore, the reproduction sheets of the present invention may be readily stabilized immediately after exposure in a relatively simple contact fixing step.

It is an object of the present invention, therefore, to provide a stabilized photosensitive material capable of providing direct positive prints upon imagewise exposure to actinic radiation. It is a further object of the invention to provide a reproduction material which will produce good quality, permanent prints upon exposure to actinic radiation at relatively fast speeds. Another object of the invention is to provide a direct print-out reproduction sheet which may be fixed by simple contact procedures. Still another object of the invention is to provide a process for the preparation of direct print-out images in permanent dye form without the requirement of a print washing step. Other objects of the invention will become apparent upon reference to the further description and examples included below.

Means for stabilizing diazo sulfonate photosensitive compositions are now provided by the present invention and are based upon the most unexpected discovery that the presence of an amide and a condition of high alkalinity, that is, of a pH in excess of about 8.5, preferably between about 8.5 and 13, will increase the storage stability at least six-fold over the best of presently available diazo sulfonate compositions. While the diazo sulfonate compositions, by the present invention, rendered normally stable, that is, resistant to precoupling under ordinary storage conditions of temperature and humidity, the photosensitivity and dye-forming activity of the compositions upon exposure to actinic radiation are apparently not substantially effected. By this manner of stabilization useful diazo sulfonates of any type, that is, sulfonates prepared from dye-forming diazonium compounds of any level of photosensitivity and coupling energy, may be employed. Thus, complete freedom in the selection of azo dye coupler and diazo compounds is provided with a resulting complete range in dyes of most desirable colors and densities.

In addition to the attainment of a practical level of storage stability, the high alkalinity of the present compositions makes possible an entirely novel diazotype product, that is, one by which negative images may be immediately printed upon light exposure. Because of the alkalinity of the composition at the time of exposure, the diazonium compound formed by the photo-decomposition of the diazo sulfonate compound immediately combines with the azo coupler compound and forms the azo dye image. Since azo coupler compounds of high coupling energy may now be employed in the diazotype composition the development of full density dyes may be effected in a matter of a few moments. Such rapid dye image development is particularly useful in photo-composition, chart recording, and the like.

The elimination of unexposed diazo sulfonate materials to form a permanent image was a substantial problem in previously-known copying methods employing diazo sulfonate materials. In view of the fact that the incidence of actinic radiation creates rather than destroys a potential dye-forming condition, it was previously necessary to physically remove unexposed materials from the surface of the sheet to prevent subsequent dye formation. This was accomplished for the most part by extended washing to dissolve the coating materials from the surface of the sheet followed by thorough rinsing and drying steps which were both time-consuming and not entirely satisfactory. It has now been found in accordance with the present invention that a simple contact fixing step is available which is entirely satisfactory in rendering a dye image permanent and without fogging or hazing tendencies.

The fixing of the diazo sulfonate diazotype compositions of the present invention is readily accomplished by contacting the surface of an imaged sheet with a solution of a strong reducing agent, such as stannous chloride. The effect of such contact is apparently to destroy the diazo sulfonate compounds and the related diazonium compounds and render them entirely incapable of achieving a dye-forming condition. Such a fixing step has been found to be immediately effective and can proceed at diazotype equipment speeds of about 30 feet per minute and in the same range as the exposures of the present positive-working diazotype sheets. These speeds are comparable to those attainable with common medium speed papers. A similarly effective material has been found in moist sulfur dioxide vapors where direct contact with the exposed sheet in an enclosed chamber renders the unexposed diazo composition entirely incapable of dye-forming reaction.

The following examples set forth some preferred embodiments of the present invention and will serve to further indicate the substance of the present invention.

EXAMPLE 1

A paper base sheet normally employed in the preparation of diazotype materials was coated at a speed of 80 yards per minute by means of an air knife coater using knife air pressure of 20 inches of water with a sensitizing composition prepared in the following manner, the proportions being expressed in parts by weight unless otherwise indicated.

A solution was prepared of—

| | |
|---|---|
| Water | 700 |
| Acrylic acid amide | 200 |
| Thiourea | 70 |
| 1,3,7-trimethylxanthine | 30 |
| 1-allyl-3-beta-hydroxymethyl-2-thiourea | 20 |
| 4'-diazo-2',5'-diethoxybenzanilide zinc chloride | 50 |

The solution was prepared at a temperature below about 40° C. in order to prevent decomposition of the diazo compound. A solution of 17 parts of sodium sulfite in 250 parts of water was prepared at a temperature of about 35° to 40° C. and was added to the previously-stated diazonium compound solution under strong agitation, whereupon the diazo sulfonate was immediately formed. With continued agitation, 55.5 parts of a 10% aqueous solution of sodium hydroxide was added to stabilize the solution in preparation for the subsequent addition of 30 parts of 2,3,dihydroxynaphthalene. Agitation was continued until complete solution was obtained. The solution exhibited a pH of about 13.0 when tested with pH indicator paper. The sensitized solution was then coated as noted above. The coated material was immediately dried by means of jet air driers utilizing air temperature of about 175° C. A total time in the drying oven of about six seconds wts required to produce a usefully dry material. The dried coating exhibited a pH of about 10.0 when tested with moist pH indicator paper.

A diazotype sheet prepared in this manner was exposed to a light source having an output in the range of 3600–4600 A.U. at a minimum exposure of 30 microwatt seconds per square centimeter and a clearly legible blue azo dye image was produced directly in about 15 seconds.

It has been observed that the range of effective spectrum absorption is broadened through the use of the diazo sulfonate as compared to the use of the diazonium salt normally employed in a diazotype composition. For example, the diazo sulfonate composition of Example 1 appeared to be effectively absorptive in a wavelength range of 3000 to 5000 A.U.; a composition prepared of the same diazonium salt was found to be absorptive in the range of 3600 to 4000 A.U.

EXAMPLE 2

A diazotype sheet prepared according to Example 1 was exposed through t negative contact master in a common diazotype white-print machine at a speed of about 30 feet per minute.

Immediately upon exposure a distinct dye image was developed in the light-struck areas. The unexposed areas of the sheet remained the deep yellow color associated with the coated diazotype sensitizing composition. The sensitized surface of the diazotype sheet was then roll coated with an aqueous solution of 20 parts of stannous chloride and 20 parts of sulfosalicylic acid in 100 parts of water. The unexposed diazonium composition was immediately bleachde to a clean white background thereby permanently fixing the print against subsequent dye formation. The fixed print was subsequent air dried.

EXAMPLE 3

A diazotype sheet prepared according to Example 1 was exposed to the light of a high pressure ultraviolet source directed through a 35 mm. negative and an appropriate lens system to acheive a 30× magnification of the negative image. An exposure of 60 sec. and subsequent fixing by exposure to sulfur dioxide vapors resulted in a clear, permanent, positive magnified image on the sheet.

Similarly effective diazotype materials were prepared as previously described through the sulfonation of diazonium compounds representative of the various classes of dye-forming diazonium compounds, viz, 2,5,dibutoxy-4-morpholino benzene-1-diazonium chloride;
4-hydroxy ethyl-benzylamido 3,6-diethoxy-benzene-1-diazonium borofluoride;
4',4 diazo of diphenylamine as the zinc chloride salt;
p-diazo-diphenylamine zinc chloride salt;
1-diazo-4-tolymercapto hydroquinone diethyl ether zinc chloride double salt; and the diazo of p-anisidine as the zinc chloride salt.

From these examples it can be seen that any of the useful classes of diazonium compounds may be employed and that consideration of compound selection may be directed in a practical manner to function desired, i.e. copy speed, etc., rather than to the restrictive requirements of pre-coupling stability which were the primary concern in the preparation of prior diazo sulfonate compositions. Depending upon the photo-activity of the diazo sulfonate compound employed, the amount of the amide stabilizer included in the composition may vary between about one to four parts of amide for each part of the diazo sulfonate compound. Usually more amide is required with the more photo-active diazonium compounds; however, the optimum amount may readily be determined by routine laboratory techniques.

Any of the commonly used alkaline coupling azo dye coupler compounds, generally of the phenol and keto types, may be used in the compositions of the present invention. The selection of coupler may be routinely made in the manner associated with common diazotype compounding, i.e. on the basis of desired development speed, dye color, etc. Direct print-out images have been successfully prepared as in the foregoing examples using the following representative couplers:

1-phenyl-3-methyl-5-pyrazoline—red image;
Phloroglucinol—black image;
Aceto acetanilide—yellow image.

The above examples have been presented for the purpose of illustration and should not be taken to limit the scope of the present invention. It will be apparent that the described examples are capable of many variations and modifications which are likewise to be included within the scope of the present invention as set forth in the appended claims.

What is claimed is:
1. Diazotype material comprising a suitable support and a layer of sensitizing composition thereon comprising:

(a) a diazo sulfonate compound capable of being decomposed by actinic radiation to yield a diazonium compound;
(b) an azo dye coupler compound capable of forming an azo dye with said diazonium compound in an alkaline environment;
(c) sufficient alkali to maintain said composition at an alkalinity between about pH 8.5 and pH 13; and
(d) between about 1 and 4 parts of acrylic acid amide per part of said diazo sulfonate.

2. A sensitizing composition for a normally stable diazotype material comprising an intimate mixture of:
(a) a diazo sulfonate compound capable of being decomposed by actinic radiation to yield a diazonium compound;
(b) an azo dye coupler compound capable of coupling with said diazonium compound in an alkaline medium to yield an azo dye;
(c) sufficient alkali to maintain said composition at an alkalinity greater than about pH 8.5; and
(d) between about 1 part to about 4 parts of acrylic acid amide per part of diazo sulfonate.

3. A method of making a permanent image which comprises:
(a) imagewise exposing to actinic radiation selected areas of a sheet according to claim 4 for a time sufficient to decompose said diazosulfonate compound, thereby causing imagewise formation of said azo dye; and
(b) contacting at least the unexposed areas of said sheet with a fixing composition comprising a strong reducing agent selected from the group consisting of stannous chloride and sulfur dioxide.

References Cited

UNITED STATES PATENTS

| | | | |
|---|---|---|---|
| 2,789,904 | 4/1957 | Bendbrook et al. | 96—49 |
| 3,076,707 | 2/1963 | Lawton et al. | 96—75 |
| 1,926,322 | 9/1933 | Van der Grinten | 96—91 XR |
| 2,500,096 | 3/1950 | Slifkin | 96—49 |
| 2,854,338 | 9/1958 | Herrick et al. | 96—49 XR |
| 3,255,007 | 6/1966 | Kosar | 96—91 XR |

OTHER REFERENCES

Landon et al., J. of Photo Sci., vol. 13, 1965, p. 150 relied on.

NORMAN G. TORCHIN, Primary Examiner

C. BOWERS, Assistant Examiner

U.S. Cl. X.R.

96—75, 91

UNITED STATES PATENT OFFICE
CERTIFICATE OF CORRECTION

Patent No. 3,512,978      Dated 19 May 1970

Inventor(s) Michael J. Lubar

It is certified that error appears in the above-identified patent and that said Letters Patent are hereby corrected as shown below:

Column 5, line 12, "tolymercapto" should read --tolylmercapto--;

Column 5, line 39, "pyrazoline" should read --pyrazolone--.

SIGNED AND SEALED

SEP 29 1970

(SEAL)
Attest:

Edward M. Fletcher, Jr.
Attesting Officer

WILLIAM E. SCHUYLER, JR.
Commissioner of Patents